(12) United States Patent
Croft et al.

(10) Patent No.: US 11,558,742 B2
(45) Date of Patent: *Jan. 17, 2023

(54) WIRELESS NETWORK ASSOCIATION AND AUTHENTICATION SYSTEM

(71) Applicants: AT&T Intellectual Property I, L.P., Atlanta, GA (US); AT&T Mobility II LLC, Atlanta, GA (US)

(72) Inventors: John Michael Croft, Dallas, TX (US); Greg Gracia, Austin, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/148,077

(22) Filed: Jan. 13, 2021

(65) Prior Publication Data

US 2021/0168607 A1  Jun. 3, 2021

Related U.S. Application Data

(63) Continuation of application No. 16/289,270, filed on Feb. 28, 2019, now Pat. No. 10,924,927.

(51) Int. Cl.
| | |
|---|---|
| *H04W 12/06* | (2021.01) |
| *H04W 12/02* | (2009.01) |
| *H04W 88/16* | (2009.01) |
| *H04W 40/24* | (2009.01) |
| *H04W 4/44* | (2018.01) |

(52) U.S. Cl.
CPC ............. *H04W 12/06* (2013.01); *H04W 4/44* (2018.02); *H04W 12/02* (2013.01); *H04W 40/244* (2013.01); *H04W 88/16* (2013.01)

(58) Field of Classification Search
None
See application file for complete search history.

(56) References Cited

U.S. PATENT DOCUMENTS

| | | |
|---|---|---|
| 8,077,681 B2 | 12/2011 | Ahmavaara et al. |
| 9,167,427 B2 | 10/2015 | Messana et al. |
| 9,178,889 B2 | 11/2015 | Metral |
| 9,445,353 B2 | 9/2016 | Ullah et al. |

(Continued)

OTHER PUBLICATIONS

Non-Final Office Action received for U.S. Appl. No. 16/289,270 dated May 20, 2020, 26 pages.

*Primary Examiner* — Hong Shao
(74) *Attorney, Agent, or Firm* — Amin, Turocy & Watson, LLP

(57) ABSTRACT

A wireless network association and authentication system includes an access point that is coupled to an authentication server via a first wireless network. The access point receives, from a first user device that associates with the access point, a first request for access to a second wireless network provided by the access point that is coupled to a wide area network through the first wireless network. The first request includes first authentication information. The access point provides the first request that includes the first authentication information to the authentication server via the first wireless network and receives a first authentication response from the authentication server via the first wireless network. In response to the first authentication response indicating that the first user device is authenticated, the access point provides the first user device access to the second wireless network.

20 Claims, 8 Drawing Sheets

(56) References Cited

U.S. PATENT DOCUMENTS

| | | |
|---|---|---|
| 9,980,134 B2 | 5/2018 | Zhang et al. |
| 10,015,672 B2 | 7/2018 | Berggren et al. |
| 2007/0008937 A1 | 1/2007 | Mody et al. |
| 2013/0097674 A1 | 4/2013 | Jindal et al. |
| 2014/0177530 A1 | 6/2014 | Zhao et al. |
| 2014/0273958 A1 | 9/2014 | Messana |
| 2015/0016416 A1 | 1/2015 | Hawkes et al. |
| 2015/0264051 A1 | 9/2015 | Hoggan |
| 2016/0150409 A1 | 5/2016 | Wen et al. |
| 2017/0034857 A1 | 2/2017 | Berggren |
| 2017/0094515 A1 | 3/2017 | Salo |
| 2017/0118638 A1 | 4/2017 | Zhang et al. |
| 2018/0376399 A1 | 12/2018 | Zhou |

WIRELESS NETWORK ASSOCIATION AND AUTHENTICATION SYSTEM

RELATED APPLICATION

The subject patent application is a continuation of, and claims priority to, U.S. patent application Ser. No. 16/289,270 (now U.S. Pat. No. 10,924,927), filed Feb. 28, 2019, and entitled "WIRELESS NETWORK ASSOCIATION AND AUTHENTICATION SYSTEM," the entirety of which application is hereby incorporated by reference herein.

TECHNICAL FIELD

This disclosure relates generally communication networks and, more particularly, to associating and authenticating user devices to a wireless network provided by an access point.

BACKGROUND

Automobile manufacturers are incorporating more computer and communication technology into automobiles. For example, wireless network access points are installed in many vehicles to provide hotspots such that the access point can provide a Wi-Fi network within and around the automobile and through which user devices access the Internet via a cellular network. The access point is often associated with a phone number that is provided by the service provider of the cellular network and associated with a user account. The service provider then bills the user associated with the user account based on the amount of data that is provided on the cellular network via the access point.

SUMMARY

Embodiments of the present disclosure describe systems and methods that provide for a method of providing wireless network association and authentication. During the method, a first request is received at an access point and from a first user device that associates with the access point. The first request for access to a first wireless network provided by the access point that is coupled to a wide area network through a second wireless network, and the first request includes first authentication information. The first request that includes the first authentication information is provided to an authentication server via the second wireless network. A first authentication response is received from the authentication server via the second wireless network. In response to the first authentication response indicating that the first user device is authenticated, the first user device is provided access to the first wireless network.

In various embodiments of the method, in response to the first authentication response indicating that the first user device is not authenticated to use the first wireless network, the first user device is disassociated from the access point and the first user device is restricted from accessing the first wireless network.

In various embodiments of the method, a second request is received at the access point for access to the first wireless network. The second request is from a second user device that associates with the access point while the first user device is accessing the first wireless network and the second request includes second authentication information. The second request including the second authentication information is provided to the authentication server via the second wireless network. A second authentication response is received from the authentication server. In response to the second authentication response indicating that the second user device is authenticated, the second user device is provided access to the first wireless network. Alternatively, in response to the second authentication response indicating that the second user device is not authenticated to access the first wireless network, the second user device is disassociated from the access point and the second user device restricted from accessing the first wireless network while the first user device is provided access to the first wireless network.

In various embodiments of the method, a second wireless protocol of the second wireless network causes an authentication between the first user device and the access point for the first wireless network that is provided by a first wireless protocol to be anonymize.

In various embodiments of the method, the access point broadcasts a beacon that includes access point information prior to receiving the first request. The beacon is provided by the access point that is configured with an association and authentication protocol that requires association and authentication before the access point provides the first user device access to the first wireless network. The first user device is configured with the association and authentication protocol and the receiving the first request is in response to the first user device determining to associate with the access point based on the access point information.

In various embodiments of the method, the second wireless network includes a proxy gateway that selects the authentication server from a plurality of authentication servers based on the first request and the first authentication information. The proxy gateway includes a Remote Authentication Dial-In User Service (RADIUS) proxy gateway, the authentication server is a RADIUS clearinghouse server, or the authentication server is a Diameter authentication server.

In various embodiments of the method, the second wireless network is a cellular network.

Embodiments of the present disclosure describe systems and methods that provide for an access point that includes a chassis, a communication system housed in the chassis that includes a first wireless communication interface and a second wireless communication interface, a processing system that is housed in the chassis and coupled to the communication system, and a memory system that is coupled to the processing system and that includes instructions that, when executed by the processing system, cause the processing system to provide an association and authentication engine that is configured to: receive, from a first user device that associates with the access point, a first request for access to a first wireless network provided by the first wireless communication interface that is coupled to a wide area network through a second wireless network via the second wireless communication interface, wherein the first request includes first authentication information, provide the first request that includes the first authentication information to an authentication server via the second wireless network, receive a first authentication response from the authentication server via the second wireless network, and in response to the first authentication response indicating that the first user device is authenticated, provide the first user device access to the first wireless network.

In various embodiments of the access point, the association and authentication engine is configured to: receive, from a second user device that associates with the access point, a second request while the first user device is accessing the first wireless network provided by the first wireless communication interface, for access to the first wireless network, wherein the second request includes second authentication information, provide the second request including the second authentication information to authentication server via the second wireless network, receive a second authentication response from the authentication server, and in response to the second authentication response indicating that the second user device is not authenticated to access the first wireless network, disassociate the second user device from the access point and restrict the first user device from accessing the first wireless network while providing the first user device access to the first wireless network.

In various embodiments of the access point a second wireless protocol of the second wireless network causes an authentication between the first user device and the access point for the first wireless network that is provided by a first wireless protocol to be anonymized.

In various embodiments of the access point, the association and authentication engine is configured to: broadcast, via the first wireless communication interface, a beacon that includes access point information prior to the receiving the first request, wherein the beacon is provided based on an association and authentication protocol that requires association and authentication before the association and authentication engine provides the first user device access to the first wireless network.

Embodiments of the present disclosure describe systems and methods that provide for a wireless network association and authentication system that includes an authentication server, and an access point that is coupled to the authentication server via a first wireless network. The access point is configured to receive, from a first user device that associates with the access point, a first request for access to a second wireless network provided by the access point that is coupled to a wide area network through the first wireless network, wherein the first request includes first authentication information, provide the first request that includes the first authentication information to the authentication server via the first wireless network, receive a first authentication response from the authentication server via the first wireless network, and in response to the first authentication response indicating that the first user device is authenticated, provide the first user device access to the second wireless network.

In various embodiments of the wireless network association and authentication system, a proxy gateway is provided between the access point and the authentication server and is configured to route the first request that includes the first authentication information to the authentication server of a plurality of authentication servers based on information included in the first request.

In various embodiments of the wireless network association and authentication system, a motor vehicle is coupled to the access point.

Figure 1:
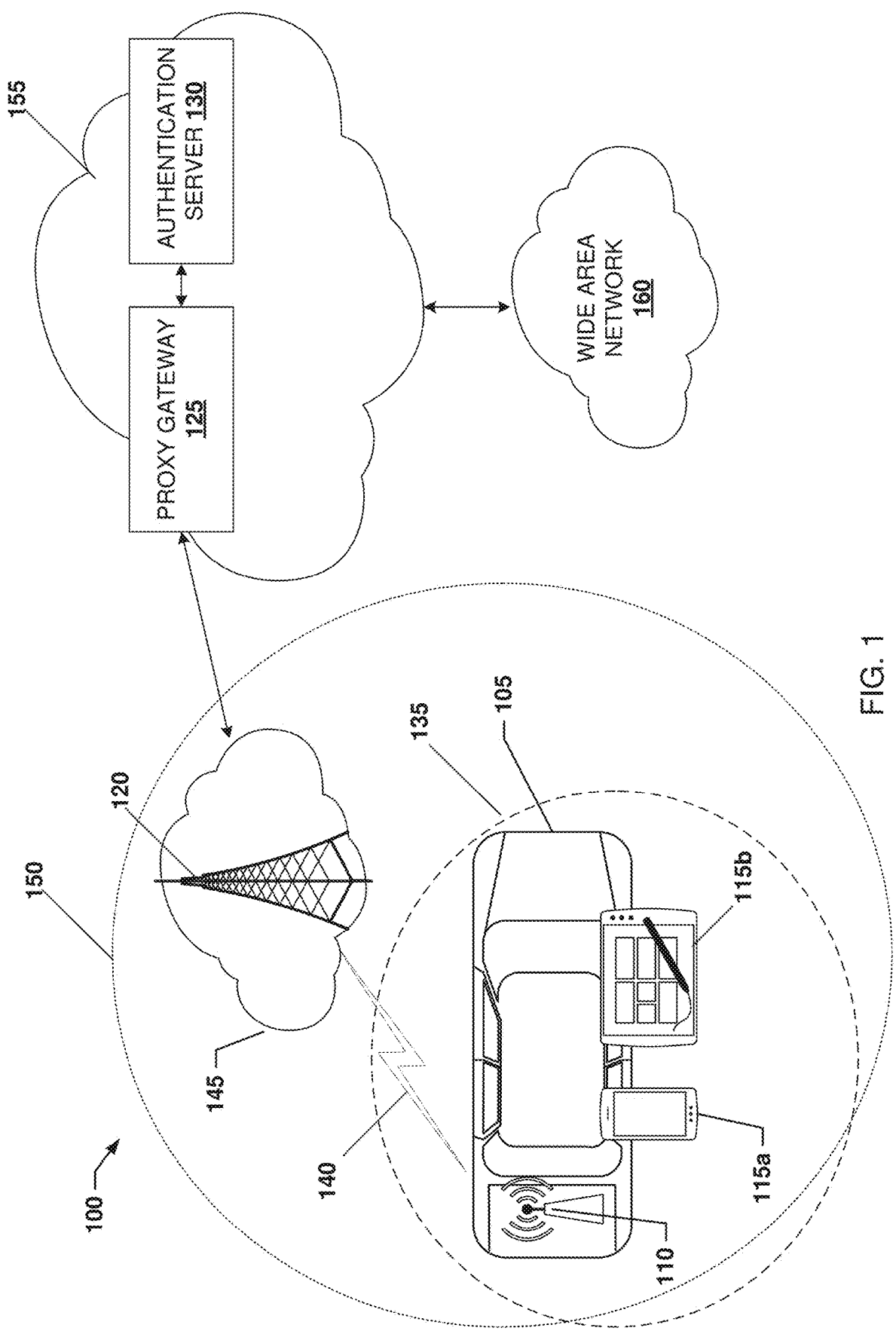
FIG. 1 is a schematic view illustrating an embodiment of a wireless network association and authentication system.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The systems and methods of the present disclosure provide for wireless network association and authentication. As discussed above, access points that connect to a cellular network are often associated with a phone number that is provided by the service provider of the cellular network and associated with a user account. The service provider then bills the user associated with the user account based on the amount of data that is provided on the cellular network via the access point. However, once the access point is connected to the cellular network, there is no way to authorize the use of Wi-Fi or other wireless network protocols in a vehicle that is restricted to individual users or devices. Existing vehicle Wi-Fi authentication solutions only allow password-based Wi-Fi authorization to happen using Wi-Fi standards like Wi-Fi Protected Access (WPA). Other solutions for individual device authentication and authorization require authorization servers (e.g., authentication, authorization, and accounting (AAA) servers) to be able to identify the user device (e.g., using methodologies such as reading a dynamic host configuration protocol (DHCP) table and authorizing a Media Access Control (MAC) address of the user device. However, third generation partnership project (3GPP) standards used on cellular networks make this infeasible where the authorization server or service is on the radio access network (RAN) because the 3GPP standards anonymize the Wi-Fi connections between the access point and the user device.

As such, each user device within proximity of the access point can access the Internet via the access point whether or not they are authorized to consume data associated with the user account of the access point. Furthermore, while each access point may require credentials from a user device before the user device can log in to the access point, when the access point is in a vehicle and a user that has a cellular network plan associated with the access device wants to change vehicles, the user has to remove the access point and install it in the other vehicle. However, some access points are not swappable and/or connected to the vehicle systems in a way that make that option impractical. As such, the user will have to log in to an access point in the other vehicle, which may not be associated with the user's user account. Similarly, when using public transportation, ride shares, and/or rental cars, a user may be required to log in to the access point that is present in those vehicles and use the data associated with the user account of those access points even though the user of the user device may not be the account holder. To circumvent the inability for a service provider to authenticate individual devices connected to an access point, authentication systems may be moved into the vehicle. However, moving an authentication system into the vehicles requires more equipment overhead, power, and processing power that some vendors do not desire in their vehicles or is not practical for swappable access points.

The systems and methods of the present disclosure provide for wireless network association and authentication via an access point based on the user or user device rather than the access point. In various embodiments, using an association and authentication protocol such as, for example, Passpoint and a proxy gateway, association of a user device to a Wi-Fi network (e.g., a connection to the Wi-Fi network) can be linked to authorization (e.g., permission to use the Wi-Fi network). This allows a service provider to provide to the user devices individually a Wi-Fi network by an access point connected to the Internet via a cellular network. As a result, overhead equipment for turning Wi-Fi on and off for an entire vehicle can be eliminated as the Wi-Fi may be left on and the access point in the vehicle may act more like a RAN network where the user devices are automatically added, dropped, restricted from the Wi-Fi network as the user devices go in and out of range of the access point connected to the Internet via a cellular network. Thus, user's may be provisioned more simply, and the service provider can avoid the retail issues associated with dialable Mobile Station International Subscriber Directory Numbers (MSISDN)s, cross-border moves, equipment swaps, and/or other usage based issues with current access points. The systems and methods of the present disclosure can also be used to enable users in rental vehicles and ride sharing situations to use Wi-Fi when in a vehicle without having the vehicle specially configured and/or in drone situations where the drone includes an access point that provides a Wi-Fi hotspot to the Internet via a cellular connection.

FIG. 1 illustrates an example of a wireless network association and authentication system 100, according to an embodiment. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

In an embodiment, the wireless network association and authentication system 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the wireless network association and authentication system 100 providing a cellular network. However, in some examples, the wireless network association and authentication system 100 may be additionally or alternatively implemented to form part of a satellite communication network, microwave radio network, and/or other wireless networks.

The wireless network association and authentication system 100 includes a motor vehicle 105, an access point 110, a user device 115a, a user device 115b, a base station 120, a proxy gateway 125, and an authentication server 130. However, in some embodiments, the motor vehicle 105 may be omitted. The motor vehicle 105, the access point 110, the user device 115a, the user device 115b, the base station 120, the proxy gateway 125, and the authentication server 130 may be in communication directly or indirectly with each other. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

In various embodiments, the motor vehicle 105 may be implemented as an unmanned aerial vehicle (UAV), an airplane, a car, a truck, a bus, a train, a submersible, a boat, a tractor, construction vehicles, and/or any unmanned or manned vehicular device that would be apparent to one of skill in the art in possession of the present disclosure. The access point 110 may be built into the motor vehicle 105 and receive power from the motor vehicle. However, in other embodiments, the access point 110 may be swappable such that it may be removed from the motor vehicle 105 and installed into another motor vehicle. In other embodiments, the access point 110 may not be built into or provided in the motor vehicle 105 at all and may be a standalone device that includes its own power supply. The access point 110 may be configured to create a localized coverage area 135 within the wireless network association and authentication system 100. The localized coverage area 135 may be a local wireless network created by the access point 110. Depending on the wireless technology and protocol provided by the access point 110 to create the localized coverage area 135, the access point 110 may be referred to as a hot spot in case of Wi-Fi or Bluetooth protocols.

The access point 110 is in communication with the base station 120 via a cellular connection 140 of a radio access network (RAN) 145 (e.g., 3G, 4G, 5G, and/or other 3GPP-based RAN) serviced by the base station 120. The access point 110 may include a communication interface that communicates with the RAN 145 provided by base station 120 while within a coverage area 150. The communication interface may include one or more radio transceivers (e.g., that include antennas) along with associated logic, circuitry, interfaces, memory, and/or code that enable communications, e.g. with the base station 120, via wireless interfaces and using the radio transceivers. In FIG. 1, the radio transceivers of the access point may include an antenna, which may be utilized to radiate and/or receive power to communicate on a network. The antenna may be contained within a housing of access point (e.g., included within the housing and/or circuitry of a mobile phone), or disposed (e.g., mounted) inside or outside a housing of the motor vehicle 105. The antenna may correspond to a cellular technology (e.g., using LTE or other cellular technology communication signal), which uses the coverage area 150 of the RAN 145.

The access point 110 may include a communication interface to wirelessly communicate with the user device 115a and/or 115b using wireless standards, such as the Institute of Electrical and Electronics Engineers (IEEE) 802.11 standard, Bluetooth® standard, ZigBee® standard, Z-Wave® standard, and/or other wireless standards; cellular standards, such as 3G, 4G, 4G LTE, 5G, and/or other cellular standards, infrared-based communication, optical-based communications, and/or other appropriate communication standards and/or protocols that create the localized coverage area 135 of the local wireless network. In some cases, the access point 110 may be configured to communicate with another device using a proprietary wireless communication protocol and interface. In some cases, the access point 110 may be configured to interface with a wired network, such as via an Ethernet interface, power-line modem, DSL modem, PSTN modem, cable modem, and/or other appropriate components for wired communication. Alternatively or in addition, the access point 110 may support proprietary wired communication protocols and interfaces. The access point 110 may be configured to communicate over a wired link (e.g., through a network router, switch, hub, or other network device) for purposes of wired communication, e.g. such as during testing and/or setup of the access point 110.

The user device 115a and/or 115b may be located within the localized coverage area 135 such that may wirelessly communicate with the access point 110. The user devices 115a and/or 115b may be, and/or may include, a mobile phone, a personal digital assistant (PDA), a tablet device, a computer, or generally any device that is operable to communicate wirelessly (e.g., via wireless standards using antennas) with the access point 110. The user devices 115a and/or 115b may also be specific in-vehicle devices, such as connected car devices, a console computing device included in the motor vehicle 105, a head-up device in the motor vehicle 105, or another device that is connected to and functions with the motor vehicle 105 that would be apparent to one of skill in the art in possession of the present disclosure.

The user devices 115a-115b may include a communication interface that communicates with the local wireless network provided by access point 110 while within the localized coverage area 135. The communication interface may include one or more radio transceivers (e.g., that include antennas) along with associated logic, circuitry, interfaces, memory, and/or code that enable communications, e.g. with the access point 110 via wireless interfaces and using the radio transceivers. In FIG. 1, the radio transceivers of the user device 115a and/or 115b include an antenna, which may be utilized to radiate and/or receive power to communicate on a network. The antenna may be contained within a housing of the user device 115a and/or 115b (e.g., included within the housing and/or circuitry of a mobile phone), or disposed (e.g., mounted) inside or outside a housing of the motor vehicle 105. The antenna may correspond to a wireless technology using wireless standards, such as the Institute of Electrical and Electronics Engineers (IEEE) 802.11 standard, Bluetooth® standard, ZigBee® standard, Z-Wave® standard and/or other wireless standards; cellular standards, such as 3G, 4G, 4G LTE, 5G, and/or other cellular standards, infrared-based communication, optical-based communications, and/or other appropriate communication standards and/or protocols. In some cases, the user device 115a and/or 115b may be configured to communicate with another device using a proprietary wireless communication protocol and interface. In some cases, the user device 115a and/or 115b may be configured to interface with a wired network, such as via an Ethernet interface, power-line modem, DSL modem, PSTN modem, cable modem, and/or other appropriate components for wired communication. Alternatively or in addition, the user device 115a and/or 115b may support proprietary wired communication protocols and interfaces. The user device 115a-115b may be configured to communicate over a wired link (e.g., through a network router, switch, hub, or other network device) for purposes of wired communication, e.g. such as during testing and/or setup of the user device 115a and/or 115b.

The base station 120 may include, may be a component of, and/or may be referred to as, a cell, a base node, a Node B (NB), an eNode B (eNB), gNodeB (gNB), or a Home eNB (HeNB). The base station 120 includes suitable logic, circuitry, interfaces, memory, and/or code that enable communications, e.g. with the access point 110, the user device 115a-115b, another base station, and/or the proxy gateway 125, via wireless interfaces utilizing one or more radio transceivers (e.g., that include antennas). In some cases, the base station 120 may be mobile (e.g., mobile base stations at ground level, mobile base stations at flight altitudes, mobile naval-based base stations, etc.), in which case its position information is dynamic.

The base station 120 may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, the base station 120 may have the coverage area 150. The coverage area of a base station may be different in different environments, at different altitudes, and at different frequency bands. For example, the base station 120 may have a smaller coverage area on a rainy day than the same base station on a sunny day, e.g. due to attenuation of signals by rain. When altitudes are taken into consideration, the coverage area provided by the base station 120 may more appropriately be referred to as a coverage volume, with different coverage areas at different altitudes. As used herein, the coverage area and coverage volume may be referred to more generally as a coverage region, where the region may be two-dimensional (e.g., coverage area) or three-dimensional (e.g., coverage volume).

The base station 120 may be in communication with the proxy gateway 125 through a backhaul network. The proxy gateway 125 may be in direct communication with the base station 120 or in communication with the base station 120 through one or more intermediary base stations, RAN components included in the RAN 145 and/or core network components included in a core network 155. As illustrated, the proxy gateway 125 may be included in the core network 155. The proxy gateway 125 may be deployed as a Remote Authentication Dial-In User Service (RADIUS) proxy and/or any other authentication service that would be apparent to one of skill in the art in possession of the present disclosure. The proxy gateway 125 may be in communication or in direct communication with the authentication server 130 (e.g., authentication, authorization, and accounting (AAA) servers). The authentication server 130 may be provided by a RADIUS server that provides a RADIUS clearinghouse for authentication. However, in other embodiments, the authentication server 130 may be provided by a cellular network provider that provides the cellular network on which the wireless network association and authentication system 100 is included. In such situations, the proxy gateway 125 may convert the RADIUS traffic to DIAMETER protocol to be provided to the authentication server 130 in the core network 155. As such, the proxy gateway 125 may be configured to examine authentication requests and route them to an appropriate authentication server 130 when there is a plurality of authentication servers 130 provide in the wireless network association and authentication system 100. The core network 155 may facilitate communications between authenticated user device and a wide area network such as the Internet, and or other networks that would be apparent to one of skill in the art in possession of the present disclosure. While a wireless network association and authentication system 100 has been illustrated and described, one of skill in the art in possession of the present disclosure will recognize that the teachings of the present disclosure will be beneficial for a variety of wireless network association and authentication systems and cellular networks and, as such, a wide variety of modifications to the number, types, and orientation of devices in the wireless network association and authentication system 100 will fall within the scope of the present disclosure as well. Furthermore, while the wireless network association and authentication system 100 is described herein as providing an access point 110 that provides a Wi-Fi local area network and connects to the wide area network 160 through a cellular network, one of skill in the art in possession of the present disclosure will recognize that local area network and the network providing access to the wide area network may be provided in any system that bridges diverse network types, anonymize connections across them, allows authentication requests to cross the bridge, and disassociates traffic for device that were not authenticated.

Figure 2:
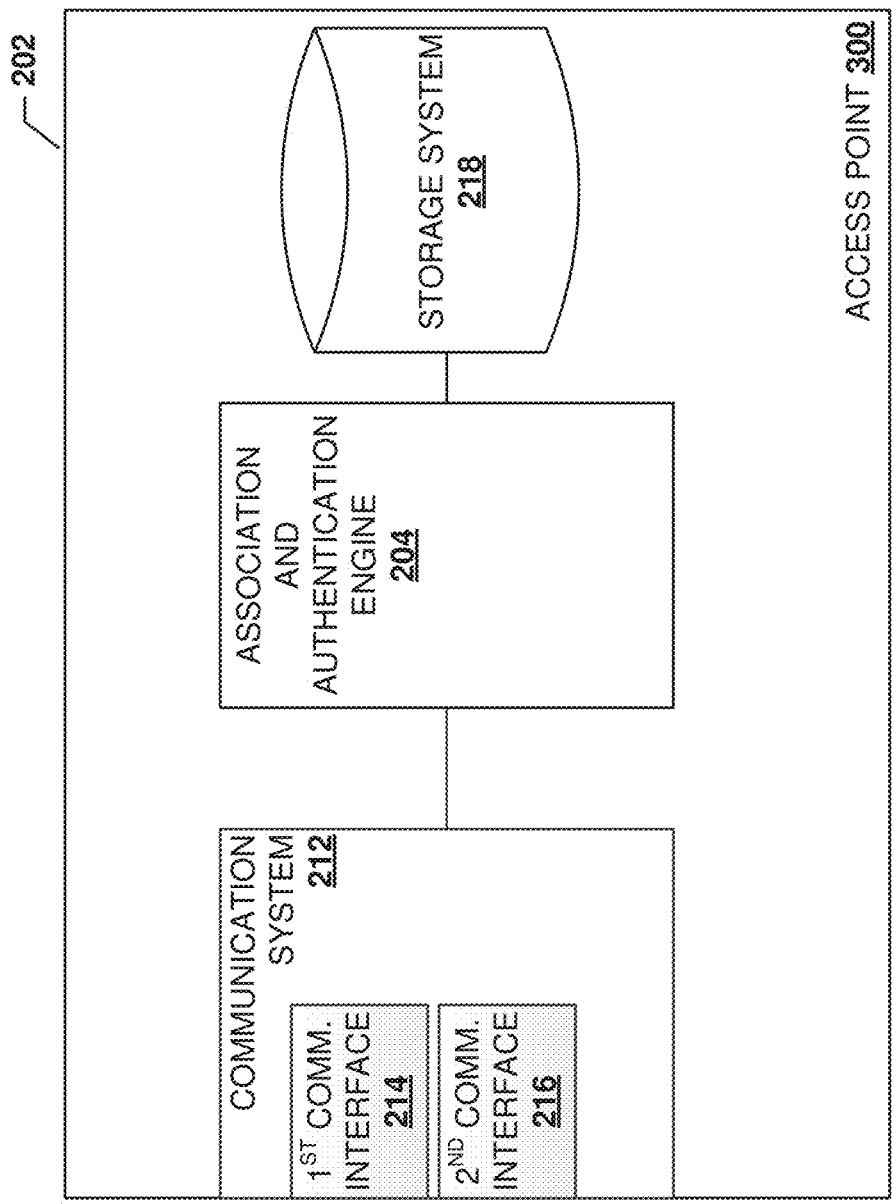
FIG. 2 is a schematic view illustrating an embodiment of an access point used in the wireless network association and authentication system of FIG. 1.

Referring now to FIG. 2, an embodiment of an access point 200 is illustrated that may be the access point 110 discussed above with reference to FIG. 1. In the illustrated embodiment, the access point 200 includes a chassis 202 that houses the components of the access point 200. Several of these components are illustrated in FIG. 2. For example, the chassis 202 may house a processing system (not illustrated) and a non-transitory memory system (not illustrated) that includes instructions that, when executed by the processing system, cause the processing system to provide an association and authentication engine 204 that is configured to perform the functions of the association and authentication engine and/or the access points discussed below. In the specific example illustrated in FIG. 2, the association and authentication engine 204 may provide an association and authentication feature that include a pre-association protocol that allows a user device to query the access point 200 for information before the user device is authenticated and associated with the access point 200. For example, the association and authentication feature may be provided by the June 2012 Wi-Fi Alliance Passport certification (Wi-Fi CERTIFIED Passpoint®) that is based on Wi-Fi Alliance Hotspot 2.0 Specification and/or any other subsequent Passpoint release that utilizes a pre-association protocol such as Access Network Query Protocol (ANQP) that allows a user device to query the access point 200 for access point information before the user device is associated with the access point 200. Passpoint is a subset of IEEE 802.11-2011 and IEEE 802.1X Extensible Authentication Protocol (EAP) may be used. However, one of skill in the art in possession of the present disclosure would recognize that any other enterprise association and authentication feature may be utilized.

The chassis 202 may further house a communication system 212 that is coupled to the association and authentication engine 204 (e.g., via a coupling between the communication system 212 and the processing system). The communication system 212 may include software or instructions that are stored on a computer-readable medium and that allow the access point 200 to send and receive information through the communication networks discussed above. For example, the communication system 212 may include a first communication interface 214 to provide for communications through to the base station 120 as detailed above (e.g., first (e.g., long-range) transceiver(s)). In an embodiment, the first communication interface 214 may be a wireless antenna that is configured to provide communications with, cellular communications, satellite communications, other microwave radio communications and/or communications. The communication system 212 may also include a second communication interface 216 that is configured to provide a local wireless network for direct communication with the user device 115a-115b, the motor vehicle 105, and/or other devices within the local coverage area 135 discussed above with respect to FIG. 1 (e.g., second (e.g., short-range) transceiver(s)). For example, the second communication interface 216 may be configured to operate according to wireless protocols such as Bluetooth®, Bluetooth® Low Energy (BLE), near field communication (NFC), infrared data association (IrDA), ANT®, Zigbee®, Z-Wave®, IEEE 802.11 protocols (Wi-Fi), and other wireless communication protocols that allow for direct communication between devices.

The chassis 202 may also house a storage system 218 that is coupled to the association and authentication engine 204 through the processing system. The storage system 218 may store access point information such as access point owner details, roaming partners, realm list, 3GPP cellular information, a domain name, 802.11u information, and/or any other information that is used in the pre-association protocol, authentication requests, and/or other communications that would be apparent to one of skill in the art in possession of the present disclosure. While an access point 200 has been illustrated and described, one of skill in the art in possession of the present disclosure will recognize that the teachings of the present disclosure will be beneficial for a variety of access points and, as such, a wide variety of modifications to the number, types, and orientation of devices and modules in the access point 200 will fall within the scope of the present disclosure as well.

Figure 3:
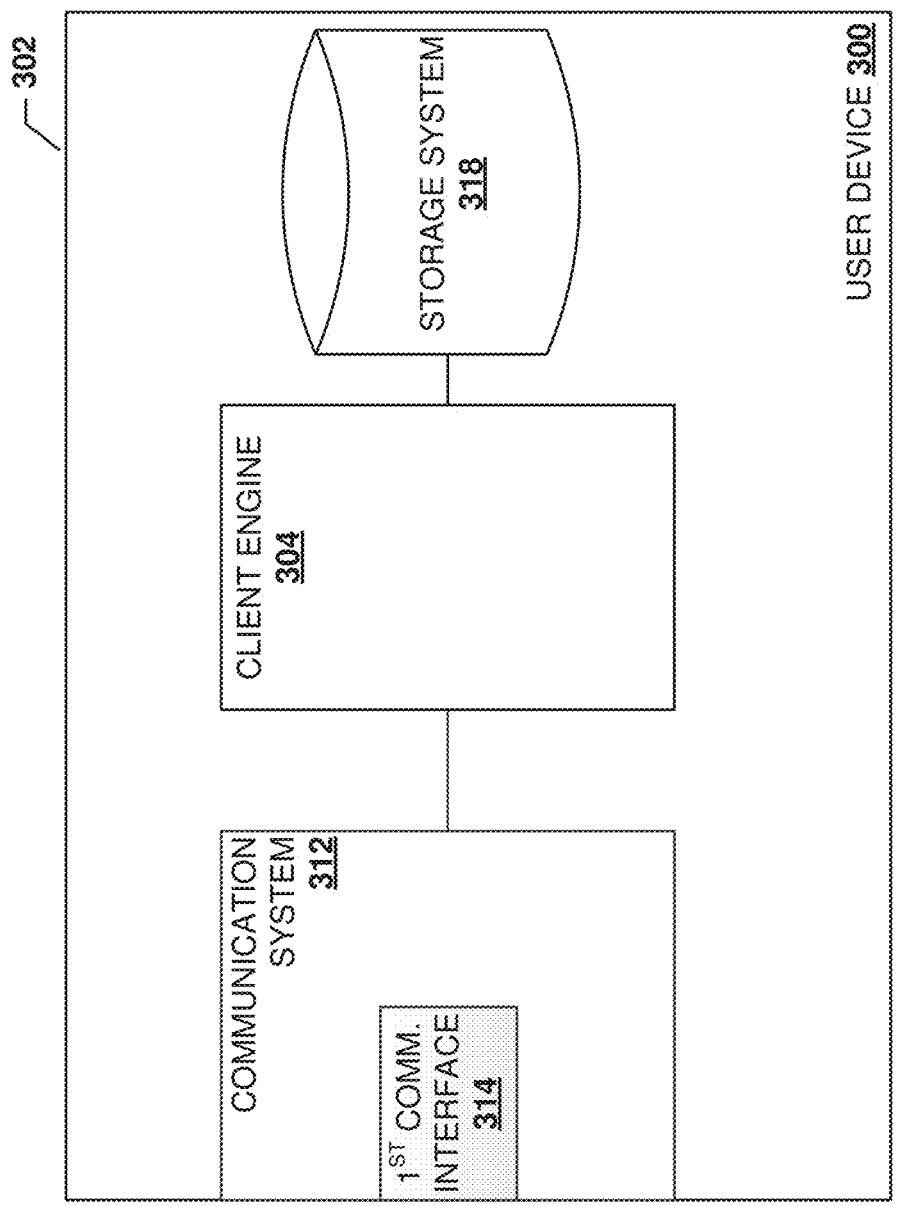
FIG. 3 is a schematic view illustrating an embodiment of user device used in the wireless network association and authentication system of FIG. 1.

Referring now to FIG. 3, an embodiment of a user device 300 is illustrated that may be the user device 115a and/or the user device 115b discussed above with reference to FIG. 1. In the illustrated embodiment, the user device 300 includes a chassis 302 that houses the components of the user device 300. Several of these components are illustrated in FIG. 3. For example, the chassis 302 may house a processing system (not illustrated) and a non-transitory memory system (not illustrated) that includes instructions that, when executed by the processing system, cause the processing system to provide a client engine 304 that is configured to perform the functions of the client engines and/or the user devices discussed below. In the specific example illustrated in FIG. 3, the client engine 304 may provide an association and authentication protocol that include a pre-association protocol that allows a user device 300 to query the access point 200 for information before the user device 300 is authenticated and associated with the access point 200. For example, the user device 300 may be certified as a Passpoint device according to the June 2012 Wi-Fi Alliance Passpoint certification and/or any other subsequent Passpoint releases that utilizes an ANQP that allows the user device 300 to query the access point 200 for access point information before the user device is associated with the access point 200.

The chassis 302 may further house a communication system 312 that is coupled to the client engine 304 (e.g., via a coupling between the communication system 312 and the processing system). The communication system 312 may include software or instructions that are stored on a computer-readable medium and that allow the user device 300 to send and receive information through the communication networks discussed above. For example, the communication system 312 may include a first communication interface 314 to provide for communications through the access point 110 as detailed above. In an embodiment, the first communication interface 314 may be configured to operate according to wireless protocols such as Bluetooth®, Bluetooth® Low Energy (BLE), near field communication (NFC), infrared data association (IrDA), ANT®, ZigBee®, Z-Wave®, IEEE 802.11 protocols (Wi-Fi), and other wireless communication protocols that allow for direct communication between devices.

The chassis 302 may also house a storage system 318 that is coupled to the client engine 304 through the processing system. The storage system 318 may store user device information such as user device details, authentication information such as user device identifiers, user credentials, certificates and/or any other information that is used in the pre-association protocol and/or used to authenticate the user device 300 that would be apparent to one of skill in the art in possession of the present disclosure. For example, any authentication information required for an EAP variant supported by the access point 110 and the user devices 115a and/or 115b may be used (e.g., EP-TLS, EAP-SIM, EAP-AKA). While a user device 300 has been illustrated and described, one of skill in the art in possession of the present disclosure will recognize that the teachings of the present disclosure will be beneficial for a variety of user devices that would be apparent to one of skill in the art in possession of the present disclosure and, as such, a wide variety of modifications to the number, types, and orientation of devices and modules in the user device 300 will fall within the scope of the present disclosure as well.

Figure 4:
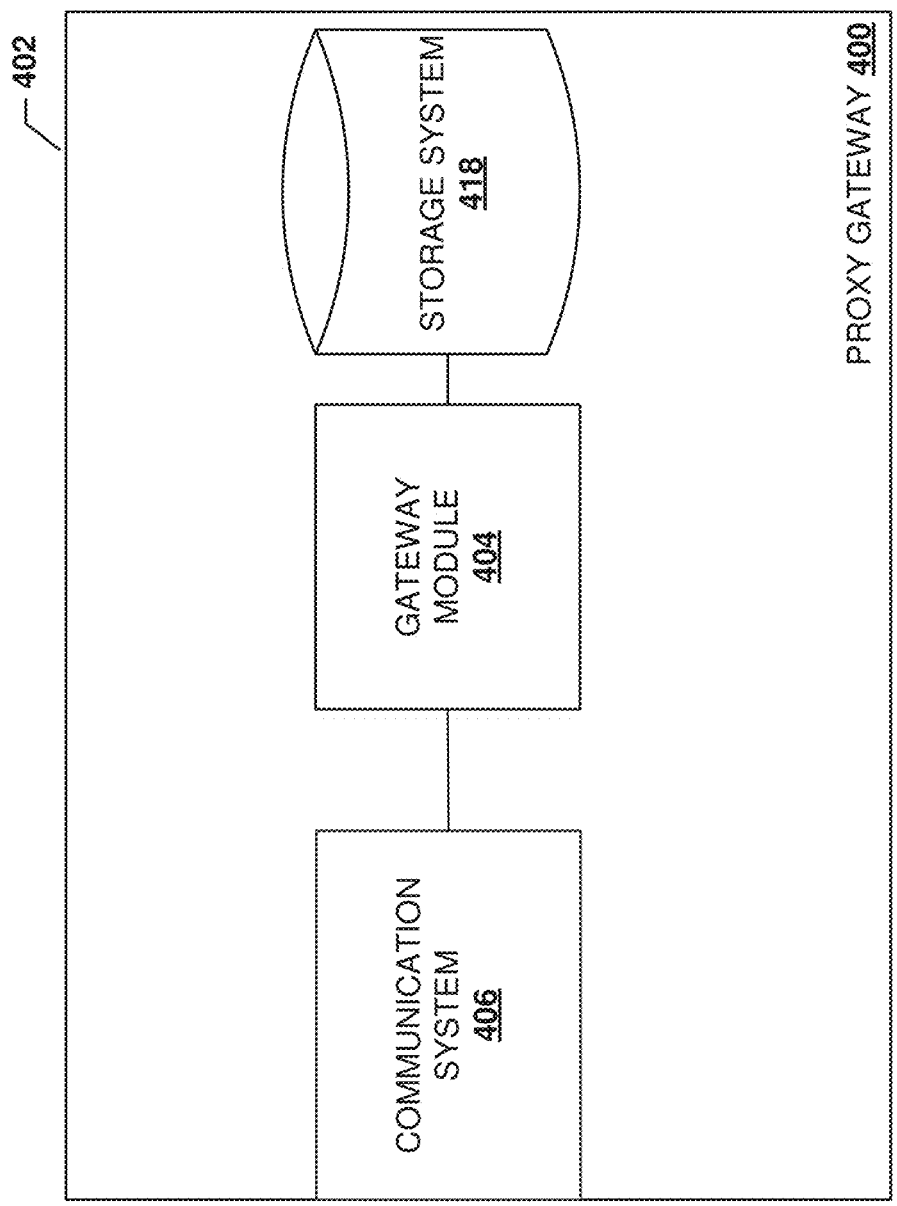
FIG. 4 is a schematic view illustrating an embodiment of a proxy gateway used in the wireless network association and authentication system of FIG. 1.

Referring now to FIG. 4, an embodiment of a proxy gateway 400 is illustrated that may be the proxy gateway 125 discussed above with reference to FIG. 1. In various embodiments, the proxy gateway 400 is a RADIUS proxy gateway that provides access to authentication servers. However, other proxy gateways that provide other services are contemplated as well. In the illustrated embodiment, the proxy gateway 400 includes a chassis 402 that houses the components of the proxy gateway 400, only some of which are illustrated in FIG. 4. For example, the chassis 402 may house a processing system (not illustrated) and a non-transitory memory system (not illustrated) that includes instructions that, when executed by the processing system, cause the processing system to provide a gateway module 404 that is configured to perform the functions of the gateway modules and/or server devices discussed below. In the specific example illustrated in FIG. 4, the gateway module 404 is configured to route an authentication request from the user device 115a and/or 115b to an appropriate authentication server 130

The chassis 402 may further house a communication system 406 that is coupled to the gateway module 404 (e.g., via a coupling between the communication system 406 and the processing system) and that is configured to provide for communication through the RAN 145, core network 155 and/or the authentication server 130, detailed below. The chassis 402 may also house a storage device (not illustrated) that provides a storage system 408 that is coupled to the gateway module 404 through the processing system. The storage system 408 may be configured to store gateway information, rules, routing instructions and/or any other information for use in the wireless network association and authentication system. While a specific proxy gateway 400 has been illustrated and described, one of skill in the art in possession of the present disclosure will recognize that the teachings of the present disclosure will be beneficial for a variety of proxy gateways that would be apparent to one of skill in the art in possession of the present disclosure and, as such, a wide variety of modifications to the number, types, and orientation of devices and modules in the proxy gateway 400 will fall within the scope of the present disclosure as well.

Figure 5:
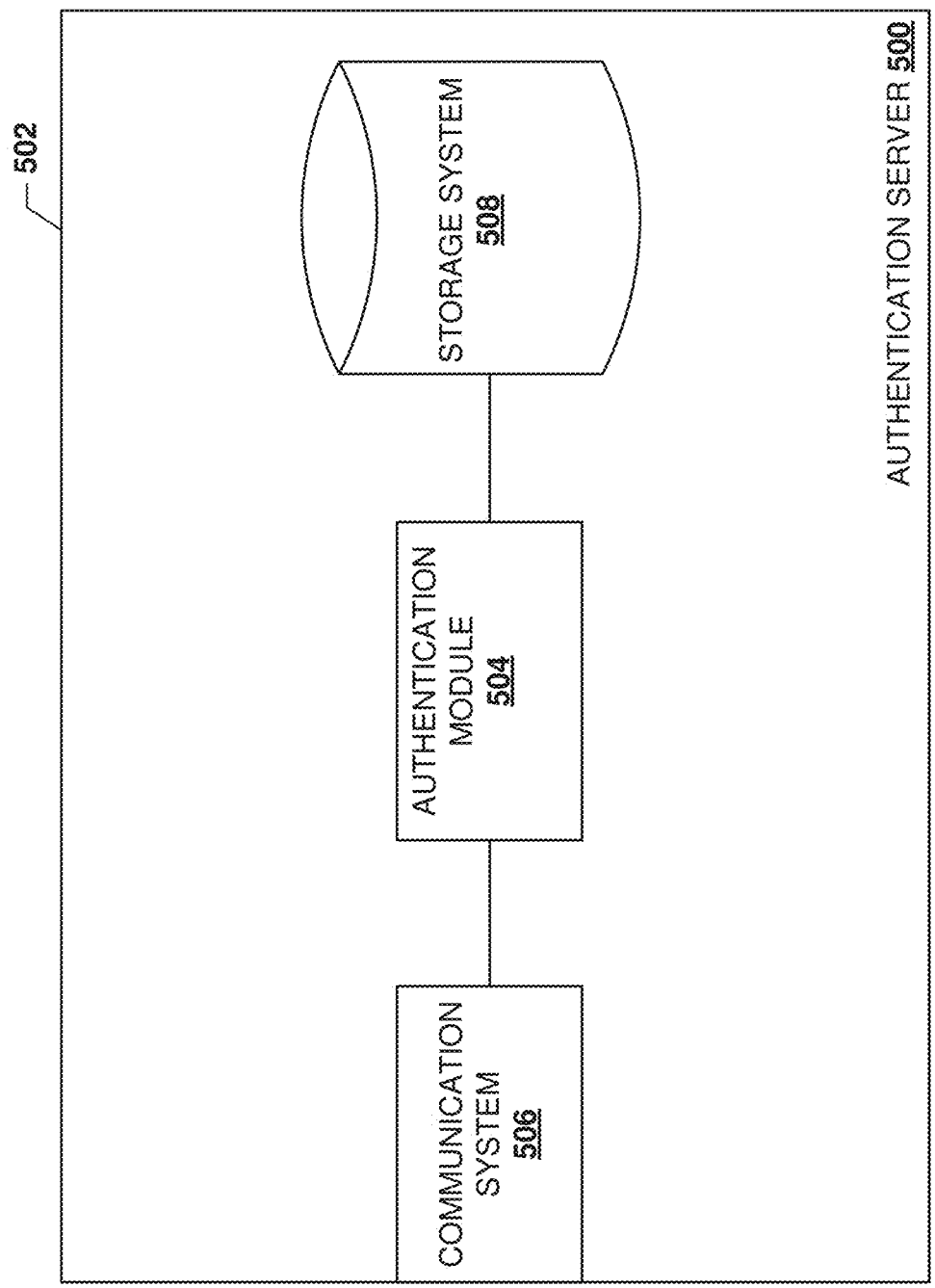
FIG. 5 is a schematic view illustrating an embodiment of an authentication server used in the wireless network association and authentication system of FIG. 1.

Referring now to FIG. 5, an embodiment of an authentication server 500 is illustrated that may be the authentication server 130 discussed above with reference to FIG. 1. In various embodiments, the authentication server 500 is an AAA server provided as RADIUS clearinghouse server or a DIAMETER authentication server, however other authentication servers that provide other services are contemplated as well. In the illustrated embodiment, the authentication server 500 includes a chassis 502 that houses the components of the authentication server 500, only some of which are illustrated in FIG. 5. For example, the chassis 502 may house a processing system (not illustrated) and a non-transitory memory system (not illustrated) that includes instructions that, when executed by the processing system, cause the processing system to provide an authentication module 504 that is configured to perform the functions of the authentication modules and/or server devices discussed below. In the specific example illustrated in FIG. 5, the authentication module 504 is configured to authenticate the user device 115a and/or 115 for use of the wide area network using the service provider's cellular network. However, one of skill in the art in possession of the present disclosure will recognize that the authentication module 504 may provide any number of services from various service providers.

The chassis 502 may further house a communication system 506 that is coupled to the authentication module 504 (e.g., via a coupling between the communication system 506 and the processing system) and that is configured to provide for communication through to the proxy gateway 125 and/or core network 155 as detailed below. The communication system 506 may allow the authentication server 500 to send and receive information over the network 112 of FIG. 1. The chassis 502 may also house a storage device (not illustrated) that provides a storage system 508 (e.g., the autonomous vehicle database 118) that is coupled to the authentication module 504 through the processing system. The storage system 508 may be configured to store authentication information such as authentication credentials, cryptographic keys, certificates, user device associations with the cellular network, and/or any other information used to authenticate user devices within the wireless network association and authentication system 100. While a specific authentication server 500 has been illustrated and described, one of skill in the art in possession of the present disclosure will recognize that the teachings of the present disclosure will be beneficial for a variety of authentication servers that would be apparent to one of skill in the art in possession of the present disclosure and, as such, a wide variety of modifications to the number, types, and orientation of devices and modules in the authentication server 500 will fall within the scope of the present disclosure as well.

Figure 6:
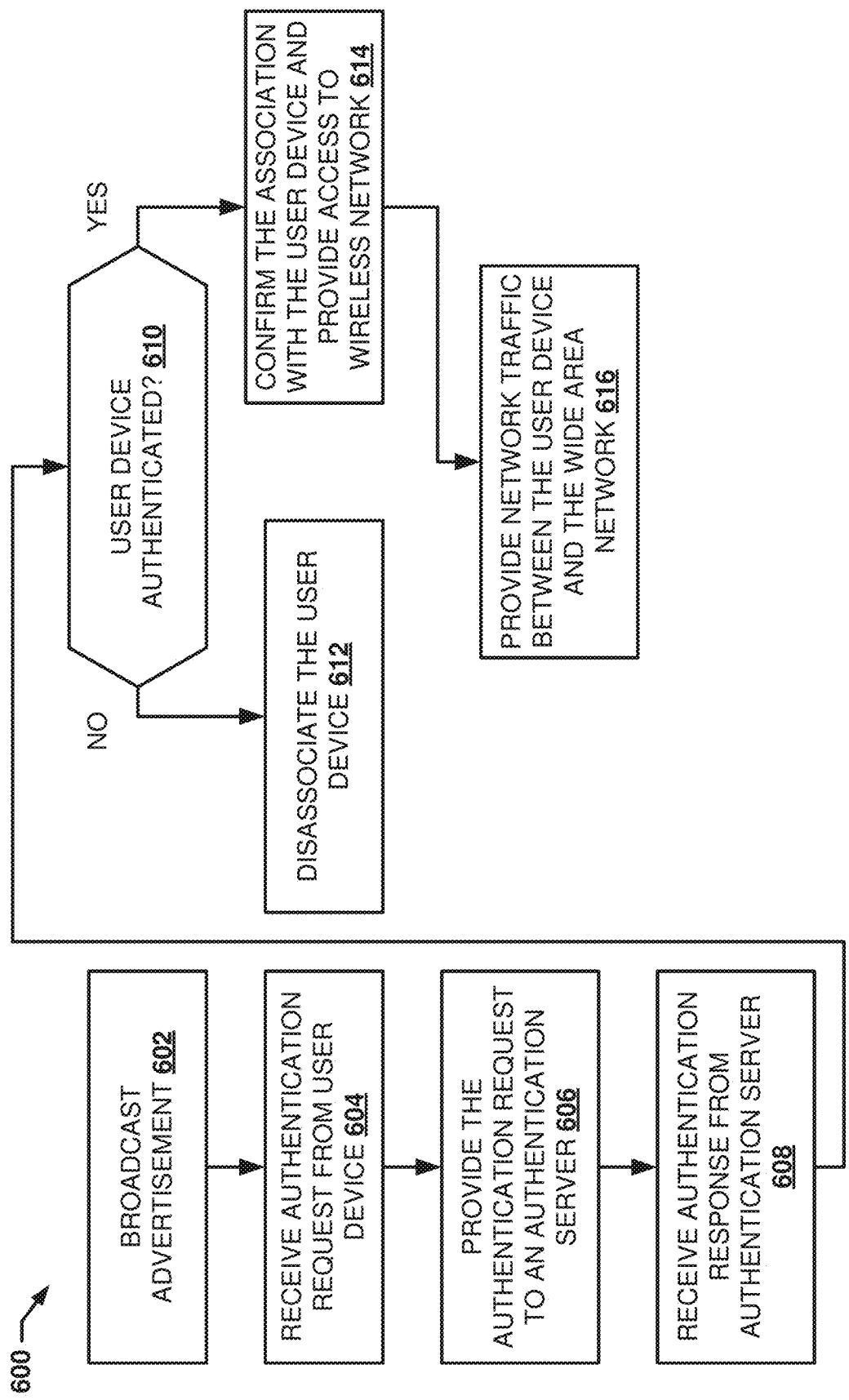
FIG. 6 is a flow chart illustrating an embodiment of a method of wireless network association and authentication.
Figure 7:
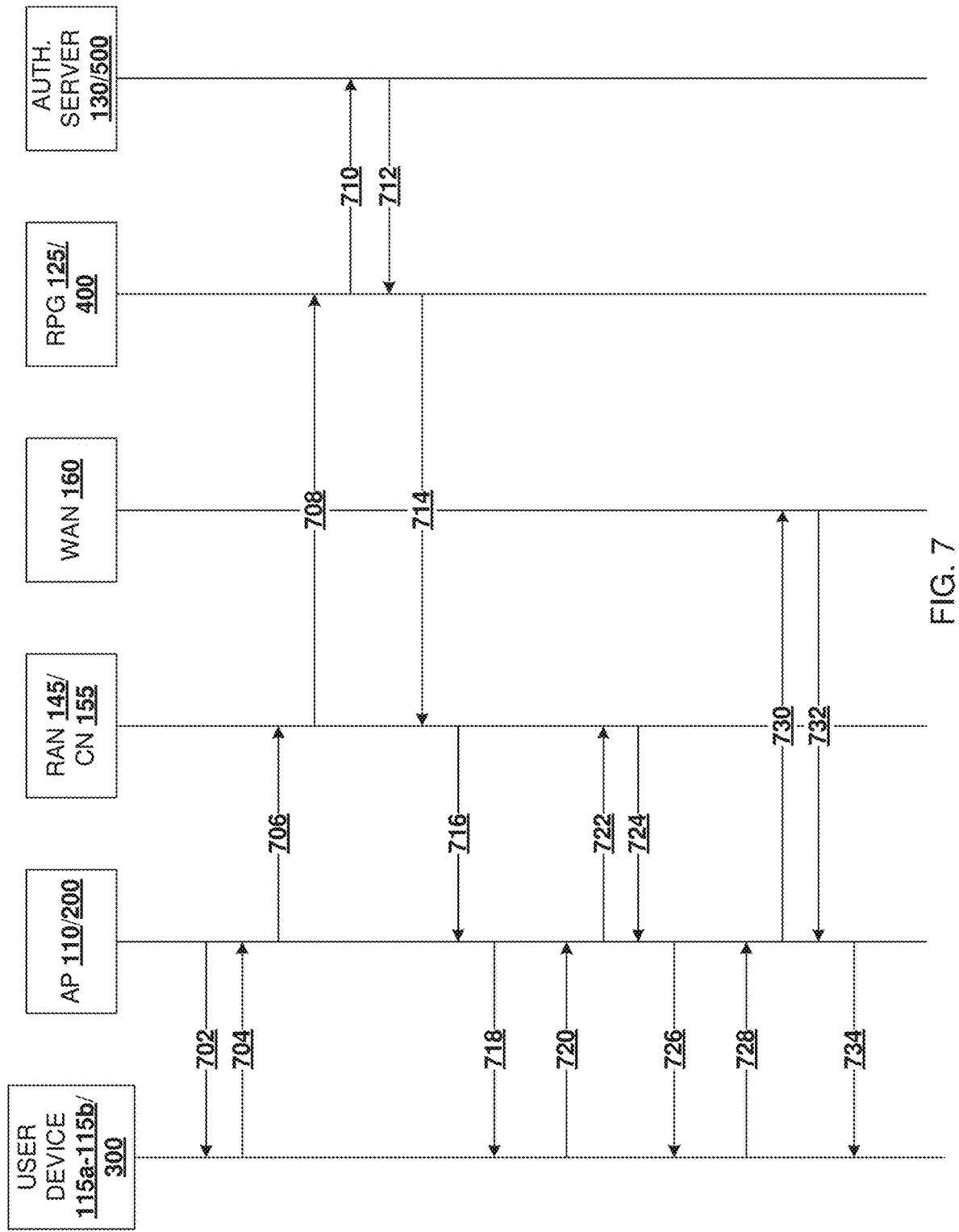
FIG. 7 is a communication diagram illustrating an embodiment of a user device being associated with and authenticated with an access point in the wireless network association and authentication system of FIG. 1 during the method of FIG. 6.

Referring now to FIG. 6, an embodiment of a method 600 of wireless network association and authentication is illustrated. The method 600 will be discussed in reference to the FIGS. above and FIG. 7 that illustrates an example communication diagram 700 of the wireless network association and authentication system 100 of FIG. 1. The method 600 begins at block 602 where an access point advertises access point information. In an embodiment of block 602 and with reference to the communication diagram 700, the access point 110 broadcasts an advertisement to the local coverage area 135 at step 702. The advertisement may include access point information that may be used by the user device 115a and/or 115b to use the access point 110. For example, the advertisement may be a Passpoint beacon that includes access point information such as, an access network type (e.g., identifying whether hotspot is for public, private or guest access), an Internet bit, indicating the access point 110 can be used for Internet access, an advertisement protocol that indicates the access point 110 supports GAS/ANQP, a roaming consortium element, a list of reachable service providers, venue information (e.g., describing the venue where the access point 110 is situated), load information indicating of current load on the access point 110 and/or any other access point information that would be apparent to one of skill in the art in possession of the present disclosure.

The method 600 then proceeds to block 604 where the access point receives an authentication request from a user device. In an embodiment of block 604 and with reference to the communication diagram 700, the access point 110 may receive an authentication from the user device 115a and/or 115b at step 704. The user device 115a, when in the local coverage area 135, may receive the advertisement provided by the access point 110. The client engine 304 of the user device 115a may determine from the access point information provided in the advertisement to request access to the wireless network provided by the access point 110. The user device 115a provide a first authentication request to the access point 110. Similarly, the user device 115b, when in the local coverage area 135, may receive the advertisement provided by the access point 110. The client engine 304 of the user device 115b may determine from the access point information provided in the advertisement request access to the wireless network provided by the access point 110. The user device 115b may provide a second authentication request to the access point 110. The first and second authentication requests may include user device information such as user device authentication information (e.g., certificates, user credentials, a phone number, a user device identifier) and/or any other user device information that would be apparent to one of skill in the art in possession of the present disclosure.

The method 600 then proceeds to block 606 where the access point provides the authentication request to an authentication server. In an embodiment of block 606, the access point 110 may provide the any authentication request received from user devices 115a and/or 115b to the authentication server 130. For example, and with reference to the communication diagram 700, the access point 110 may provide the first authentication request to the base station 120 of the RAN 145 via the cellular connection 140 at step 706. The first authentication request may include access point information about the access point 110 in addition to the user device information. The base station 120 may forward the first authentication request through the RAN 145 to the proxy gateway 125 at step 708. The first authentication request may be whitelisted when being provided from the RAN 145 to the proxy gateway 125 at step 708. The authentication server or other application servers that the service provider requires the client device to communicate with to provide service is whitelisted so that the client device can communicate with the server before it is authenticated and associated with the access point. Similarly, the access point 110 may provide the second authentication request to the base station 120 of the RAN 145 via the cellular connection 140 at step 706. The second authentication request may include access point information about the access point 110 in addition to the user device information.

The base station 120 may forward the second authentication request through the RAN 145 to the proxy gateway 125 at step 708. The second authentication request may be whitelisted when being provided from the RAN 145 to the proxy gateway 125, at step 708.

At step 710, the proxy gateway 125 may provide the first authentication request and/or the second authentication request to the authentication server 130. The proxy gateway 125 may determine which of a plurality of authentication servers 130 to provide the first authentication request and/or second authentication request based on an addressing scheme such as, for example, a domain name and/or a realm provided in the first authentication request. For example, the realm may include a network address identifier (NAI) realm (e.g., "serviceprovider_phonetype.com"). Other addressing schemes may include PLMN ID, an organization identifier and/or other addressing schemes that would be apparent to one of skill in the art in possession of the present disclosure. For example, authentication requests of customers of a cell network may be routed to an authentication server provided by the service provider of the cell network. However, authentication requests of customers of other service providers may be routed to another server such as a RADIUS Clearinghouse. For example, if the service provider of the cellular network wishes to enable roaming, either for clients of other providers or for clients of 3rd party services, then communication with the 3rd party services (e.g., a car rental agency or a vehicle OEM) may be required. An authentication server provided by a RADIUS Clearinghouses provide a service of connecting disparate providers and allowing them to establish billing and traffic approval rules.

Once the authentication server 130 receives the first authentication request and/or the second authentication request, the authentication server 130 may process the first authentication request and/or second authentication request. For example, the authentication server 130 may compare the user device information provided in the first authentication request to authentication information stored in the storage system 508 of the authentication server 130 to determine whether the user device 115a is permitted to associate with the access point 110 and access the wireless network provided by the access point 110. The user of the user device 115a may have an account or paid subscription with the service provider of the wireless network association and authentication system 100 to use the access point 110 that can access the wide area network 160 via the service provider's cellular network. Thus, the authentication server 130, by comparing user device information (e.g., credential, a user device identifier, etc.) to authorization information of authorized user devices/users in the storage system 508, will determine that the user device 115a is authorized to access the wireless network provided by the access point 110 to communicate with the wide area network 160.

In another example, the authentication server 130 may compare the user device information provided in the second authentication request to authentication information stored in the storage system 508 of the authentication server 130 to determine whether the user device 115b is permitted to associate with the access point 110. The user of the user device 115b may not have an account or paid subscription with the service provider of the wireless network association and authentication system 100 to access the wireless network provided by the access point 110 that can access the wide area network 160 via the service provider's cellular network. Thus, the authentication server 130, by comparing the user device information (e.g., credential, a user device identifier, etc.) provided in the second authentication request to authorization information of authorized user devices/ users in the storage system 508, will determine that the user device 115b is not authorized to access the wireless network provided by the access point 110 to communicate with the wide area network 160.

At step 712, the authentication server 130 may provide an authentication response back to the proxy gateway 125. For example, the authentication server 130 may provide a first authentication response that may include an indication that the user device 115a is authorized to access the wireless network provided by the access point 110. In another example, the authentication server 130 may provide a second authentication response that may include an indication that the user device 115b is not authorized to access the wireless network provided by the access point 110. At step 714, the proxy gateway 125 may route the authentication response (e.g., the first authentication response and/or the second authentication response) to the RAN 145 and the RAN 145 may forward the authentication response (e.g., the first authentication response and/or the second authentication response) to the appropriate access point 110 via the base station 120 at step 716.

The method 600 then proceeds to block 608 where the access point receives the authentication response. In an embodiment of block 608, the access point 110 may receive the authentication response to the authentication request at step 716 of the communication diagram 700. The access point 110 may process the authentication response to determine whether the user device associated with the authentication response is authenticated to access the wireless network provided by the access point 110 and access the wireless network provided by the access point 110 at decision block 610. If the access point determines the user device is not authorized to associate with the access point at decision block 610, then the method 600 proceeds to block 612 where the access point disassociates the user device. In an embodiment of block 612, the access point 110 may determine that the second authentication response indicates that the user device 115b is not authorized to access the wireless network provided by the access point 110. The access point 110 may provide a notification, at step 718, that indicates that the user device 115b is not authorized to access the wireless network provided by the access point 110, which causes the user device 115b to disassociate with the access point 110. In other examples, the access point 110 may disassociate the user device 115b and/or prevent any traffic from being provided between the user device 115b and the wide area network 160.

If the access point determines the user device is authorized to access the wireless network provided by the access point at decision block 610, then the method 600 proceeds to block 614 where the access point confirms the association between access point and the user device and provides access to the wireless network provided by the access point. In an embodiment of block 614, the access point 110 may determine that the first authentication response indicates that the user device 115a is authorized to access the wireless network provided by the access point 110, and thus access the wide area network 160 via the access point 110. In one example, the access point 110 may provide a notification, at step 718, that indicates that the user device 115a is authorized to access the wireless network provided by the access point 110. The user device 115a may associate with the access point 110 to gain full access to the local area network.

The method 600 may then proceed to block 616 where the access point 110 provides network traffic between the user device and the wide area network. In an embodiment of block 616, after the user device 115a is authenticated and associated with the access point 110, the access point 110 may protocol traffic between the user device 115a and the RAN 145 and/or core network 155 to configure the user device 115a to communicate with the wide area network 160. For example, at steps, 720, 722, 724, and 726, the access point 110 may provide DHCP, DNS, and/or other protocol traffic between the user device 115a and the RAN 145 and/or core network 155. At steps 728, 730, 732, and 734, network traffic (e.g., Internet traffic) may be provided between the wide area network 160 and the user device 115a. Because the user device 115b is not associated and authenticated to use the access point 110, no network traffic is provided to the user device 115b even though user device 115a is able to provide and receive network traffic via the access point 110.

Thus, systems and methods of the present disclosure provide for wireless network association and authentication. By using an association and authentication protocol at an access point, a service provider may provide wide area network access selectively to user devices that are in a local coverage area of a local wireless network provided by an access point that communicates with the wide area network via a cellular network. The association and authentication protocols allow for authentication servers to authenticate the user devices over a cellular network. Conventional authentication of user devices accessing the access point through communication protocols such as Wi-Fi are ultimately anonymized by the cellular network (e.g., 3GPP standards) when the authentication server is on the far side of a Wi-Fi-to RAN bridge. Thus, a cellular network service provider may provide Wi-Fi to individual devices via a cellular network. As such, user devices can be provided more simply, and the cellular service provider issues associated with providing dialable MSISDNs to access points, cross-border moves, equipment swaps, and other usage-based issues can be resolved. Also, systems and methods of the present disclosure may be used to enable users in rental cars, and ride sharing situations to use Wi-Fi in a vehicle without having the vehicle be specially configured with the cellular network.

Figure 8:
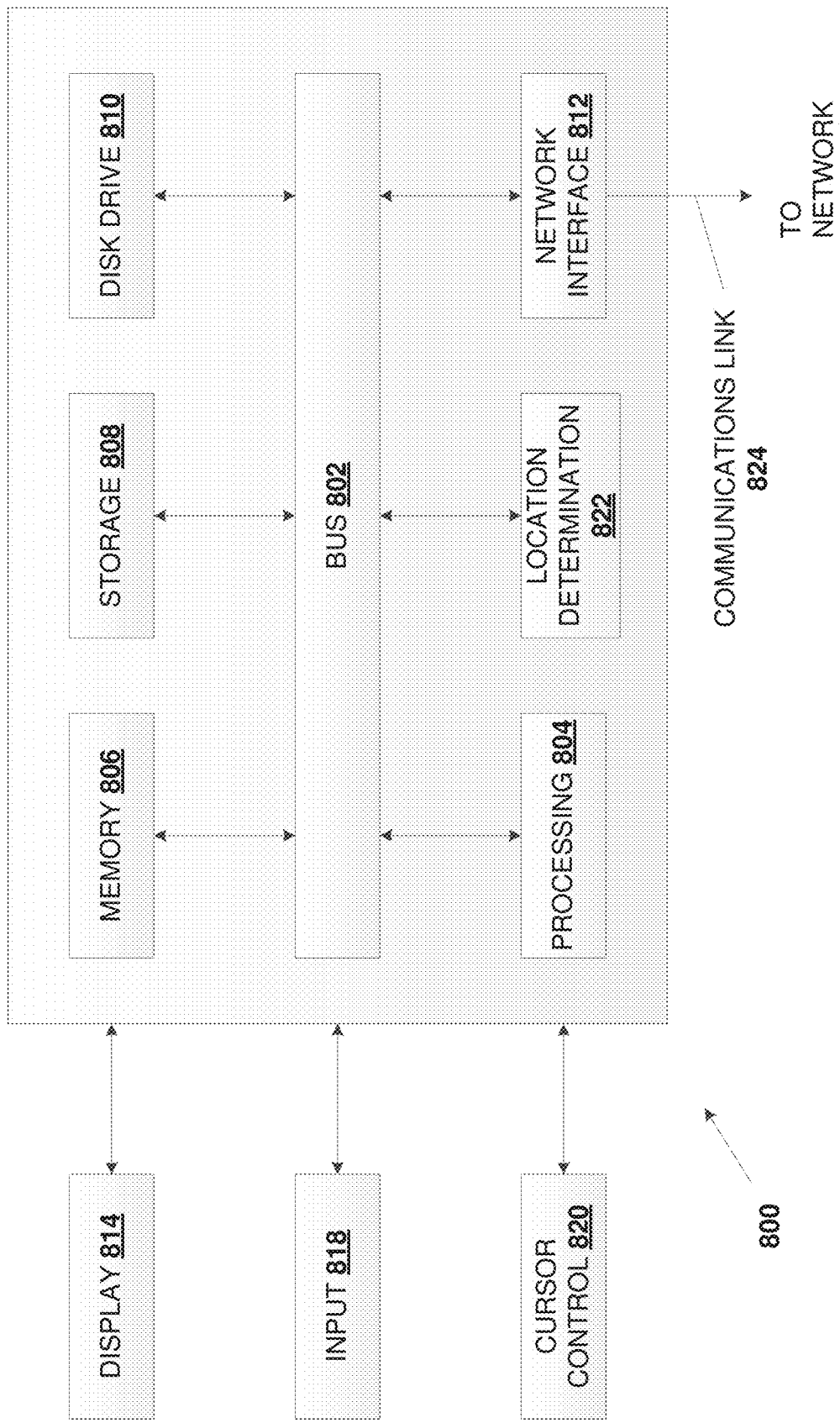
FIG. 8 is a schematic view illustrating an embodiment of a computer system.

Referring now to FIG. 8, an embodiment of a computer system 800 suitable for implementing, for example, the access point 110 and 200, the user devices 115a, 115b, and 300, the proxy gateway 125 and 400, and the authentication server devices 130 and 500 and implementing in the motor vehicle 105 is illustrated. It should be appreciated that other devices utilized in the wireless network association and authentication system 100 discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices.) In one implementation, the disk drive component 810 may comprise a database having one or more disk drive components.

In accordance with embodiments of the present disclosure, the computer system 800 performs specific operations by the processing component 804 executing one or more sequences of instructions contained in the system memory component 806, such as described herein with respect to the drone(s), the drone docking station(s), the service platform, and/or the remote monitor(s). Such instructions may be read into the system memory component 806 from another computer-readable medium, such as the static storage component 808 or the disk drive component 810. In other embodiments, hardwired circuitry may be used in place of or in combination with software instructions to implement the present disclosure.

Logic may be encoded in a computer-readable medium, which may refer to any medium that participates in providing instructions to the processing component 804 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 810, volatile media includes dynamic memory, such as the system memory component 806, and tangible media employed incident to a transmission includes coaxial cables, copper wire, and fiber optics, including wires that comprise the bus 802 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the various networks (e.g., the RAN 145, the core network 155, the wide area network 160, and/or other LANs, WLANs, PTSNs, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (e.g., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A method, comprising:
    receiving, by network equipment comprising a processor, a request from a user equipment for access to a network service associated with a network coupled to a cellular communication network, wherein the request comprises authentication information, wherein an authentication between the network equipment and the user equipment is anonymized via the cellular communication network, and wherein the authentication information being anonymized comprises the authentication information appearing to an authentication server of the cellular communication network to originate from the network equipment instead of the user equipment;
    sending, by the network equipment, the authentication information to the authentication server using a non-anonymized protocol, resulting in the authentication information appearing to the authentication server to be associated with the user equipment; and
    in response to the authentication server indicating that the user equipment has been authenticated, providing, by the network equipment, access to the network service associated with the network by the user equipment.

2. The method of claim 1, wherein the non-anonymized protocol is an association and authentication protocol.

3. The method of claim 1, further comprising:
    receiving, by the network equipment, an authentication response from the authentication server in response to sending the authentication information to the authentication server, wherein providing the access to the network service comprises providing the access to the network service further in response to the authentication response indicating that the user equipment is authenticated.

4. The method of claim 1, wherein the request is a first request, wherein the user equipment is a first user equipment, wherein the authentication information is first authentication information, and wherein the method further comprises:

receiving, by the network equipment, a second request from a second user equipment for access to the network service, wherein the second request comprises second authentication information; and sending, by the network equipment, the second authentication information to the authentication server using the non-anonymized protocol, resulting in the second authentication information appearing to the authentication server to be associated with the second user equipment.

5. The method of claim 4, further comprising:

in response to the authentication server indicating that the second user equipment is not authenticated:
  disassociating, by the network equipment, the second user equipment from the network equipment; and
  restricting, by the network equipment, the second user equipment from accessing the network service while continuing to provide the access to the network service by the first user equipment.

6. The method of claim 1, wherein providing the access to the network service comprises providing the access to the network service by the user equipment via a wide area network of the network.

7. The method of claim 1, further comprising:

broadcasting, by the network equipment, network connectivity information associated with the network equipment.

8. The method of claim 7, wherein receiving the request from the user equipment comprises receiving the request from the user equipment in response to broadcasting the network connectivity information.

9. The method of claim 7, wherein the network connectivity information comprises protocol information relating to the non-anonymized protocol, and wherein the authentication information included in the request is configured according to the non-anonymized protocol in accordance with the protocol information.

10. Network equipment, comprising:

a processor; and a memory that stores executable instructions that, when executed by the processor, facilitate performance of operations, comprising:
  receiving a request from a user equipment for access to a network coupled to a cellular communication network, wherein the request comprises authentication information, and wherein an authentication occurs at the cellular communication network between the network equipment and the user equipment that causes the authentication to be anonymized such that the authentication information appears, to an authentication server of the cellular communication network, to be associated with the network equipment instead of the user equipment;
  transmitting the authentication information to the authentication server using a non-anonymized protocol such that the authentication information appears to the authentication server to be associated with the user equipment; and
  enabling access to the network by the user equipment in response to the authentication server indicating that the user equipment is authenticated.

11. The network equipment of claim 10, wherein the non-anonymized protocol is an association and authentication protocol.

12. The network equipment of claim 10, wherein the operations further comprise:

receiving an authentication response from the authentication server in response to transmitting the authentication information to the authentication server; and enabling the access to the network further in response to the authentication response indicating that the user equipment is authenticated.

13. The network equipment of claim 10, wherein the request is a first request, wherein the user equipment is a first user equipment, wherein the authentication information is first authentication information, and wherein the operations further comprise:

receiving a second request from a second user equipment for access to the network, the second request comprising second authentication information; and transmitting the second authentication information to the authentication server using the non-anonymized protocol such that the second authentication information appears to the authentication server to be associated with the second user equipment.

14. The network equipment of claim 13, wherein the operations further comprise:

in response to the authentication server indicating that the second user equipment is not authenticated:
  disassociating the second user equipment from the network equipment; and
  preventing the second user equipment from accessing the network while continuing to provide the access to the network to the first user equipment.

15. The network equipment of claim 10, wherein enabling the access to the network comprises:

enabling access to a wide area network by the user equipment via the network in response to the authentication server indicating that the user equipment is authenticated.

16. A non-transitory machine-readable medium, comprising executable instructions that, when executed by a processor, facilitate performance of operations, comprising:

receiving, from a user equipment, an access request for network services associated with a network coupled to a cellular network, wherein the access request comprises authentication information, and wherein the cellular network facilitates an authentication between network equipment of the network and the user equipment that causes the authentication to be anonymized, wherein the authentication being anonymized comprises the authentication information appearing to an authentication server that is part of the cellular network to be associated with the network equipment instead of the user equipment;

submitting the authentication information to the authentication server using a non-anonymized protocol, as a result of which the authentication information appears to the authentication server to be associated with the user equipment; and enabling access to the network services by the user equipment in response to the authentication server indicating that the user equipment is authenticated.

17. The non-transitory machine-readable medium of claim 16, wherein the operations further comprise:

receiving an authentication response from the authentication server in response to submitting the authentication information to the authentication server; and enabling the access to the network services further in response to the authentication response indicating that the user equipment is authenticated.

18. The non-transitory machine-readable medium of claim 16, wherein the access request is a first access request, wherein the user equipment is a first user equipment, wherein the authentication information is first authentication information, and wherein the operations further comprise:

receiving a second access request from a second user equipment for access to the network services, the second access request comprising second authentication information; and submitting the second authentication information to the authentication server using the non-anonymized protocol, as a result of which the second authentication information appears to the authentication server to be associated with the second user equipment.

19. The non-transitory machine-readable medium of claim 18, wherein the operations further comprise preventing the second user equipment from accessing the network services while continuing to enable the access to the network services by the first user equipment in response to the authentication server indicating that the second user equipment is not authenticated.

20. The non-transitory machine-readable medium of claim 16, wherein enabling the access to the network services comprises:

enabling, via the network, access to wide area network services of a wide area network by the user equipment in response to the authentication server indicating that the user equipment is authenticated.

\* \* \* \* \*